(12) United States Patent
Potvin et al.

(10) Patent No.: US 10,457,340 B2
(45) Date of Patent: Oct. 29, 2019

(54) ADJUSTABLE BODY SKIRTING ASSEMBLY AND A VEHICLE

(71) Applicant: GM Global Technology Operations LLC, Detroit, MI (US)

(72) Inventors: Caleb Potvin, Sterling Heights, MI (US); Timothy D. Demetrio, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 27 days.

(21) Appl. No.: 15/710,198

(22) Filed: Sep. 20, 2017

(65) Prior Publication Data

US 2019/0084630 A1     Mar. 21, 2019

(51) Int. Cl.
*B60J 9/00* (2006.01)
*B62D 35/00* (2006.01)
*B62D 25/02* (2006.01)

(52) U.S. Cl.
CPC .......... *B62D 35/008* (2013.01); *B62D 25/02* (2013.01)

(58) Field of Classification Search
CPC ............... B65D 47/305; B65D 50/045; B65D 2543/00537; B65D 50/046; A47B 95/043; A47J 43/046; B05B 11/3032; E02B 15/08; E02B 15/0814; Y02A 20/204
USPC ...................................................... 296/24.34
See application file for complete search history.

(56) References Cited

U.S. PATENT DOCUMENTS

| | | | | |
|---|---|---|---|---|
| 5,280,990 A * | 1/1994 | Rinard | ................. | B62D 35/001 296/180.1 |
| 6,644,720 B2 * | 11/2003 | Long | .................... | B62D 25/168 296/180.4 |
| 7,497,502 B2 * | 3/2009 | Wood | ................... | B62D 35/001 296/180.1 |
| 7,604,284 B2 * | 10/2009 | Reiman | ................ | B62D 35/001 296/180.1 |
| 7,740,303 B2 * | 6/2010 | Wood | ................... | B62D 35/001 296/180.1 |
| 7,837,254 B2 * | 11/2010 | Reiman | ................ | B62D 35/001 296/180.4 |
| 7,845,709 B2 * | 12/2010 | Browne | ............... | B62D 25/182 296/180.5 |
| 7,942,466 B2 * | 5/2011 | Reiman | ................ | B62D 35/008 296/180.4 |
| 7,950,721 B1 * | 5/2011 | Peterson | .............. | B62D 35/001 296/180.4 |

(Continued)

*Primary Examiner* — Kiran B Patel
(74) *Attorney, Agent, or Firm* — Quinn IP Law

(57) ABSTRACT

An adjustable body skirting assembly and a vehicle that includes the assembly. The assembly includes a support structure and a skirt member. The support structure includes a side surface and a bottom surface, and the skirt member is supported by the support structure. The skirt member is movable between a deployed position in which the skirt member is disposed transverse to the bottom surface of the support structure such that the skirt member and the side surface cooperate with each other to define a wall configured to redirect an airflow away from the bottom surface, and a retracted position in which the skirt member retracts relative to the side surface such that the wall is removed which allows the airflow to interact with the bottom surface. The assembly includes an actuator coupled to the skirt member and configured to move the skirt member to the deployed and retracted positions.

20 Claims, 2 Drawing Sheets

(56) References Cited

U.S. PATENT DOCUMENTS

| | | | | |
|---|---|---|---|---|
| 8,087,715 B2* | 1/2012 | Andrus | B62D 35/001 | 296/180.1 |
| 8,162,384 B2* | 4/2012 | Giromini | B62D 25/168 | 296/180.4 |
| 8,186,745 B2* | 5/2012 | Graham | B62D 35/001 | 296/180.1 |
| 8,303,025 B2* | 11/2012 | Senatro | B62D 35/001 | 296/180.4 |
| 8,366,180 B2* | 2/2013 | Lee | B62D 35/001 | 296/180.4 |
| 8,376,450 B1* | 2/2013 | Long | B62D 35/001 | 296/180.4 |
| 8,727,425 B1* | 5/2014 | Senatro | B62D 35/001 | 296/180.4 |
| 8,899,660 B1* | 12/2014 | Praskovskaya | B62D 35/001 | 296/180.1 |
| 8,985,677 B2* | 3/2015 | Wiegel | B62D 35/001 | 296/180.4 |
| 9,004,575 B2* | 4/2015 | Grandominico | B62D 25/168 | 296/180.4 |
| 9,045,176 B1* | 6/2015 | Henderson, II | B62D 35/001 | |
| 9,051,013 B1* | 6/2015 | Popa | B62D 35/004 | |
| 9,132,869 B2* | 9/2015 | Dayton | B62D 35/02 | |
| 9,248,872 B2* | 2/2016 | White | B62D 35/001 | |
| 9,296,433 B2* | 3/2016 | Roush | B62D 35/001 | |
| 9,340,240 B2* | 5/2016 | Clark | B62D 35/001 | |
| 9,409,610 B2* | 8/2016 | Baker | B62D 35/001 | |
| 9,440,689 B1* | 9/2016 | Smith | B62D 35/02 | |
| 9,481,406 B2* | 11/2016 | Wirth | B62D 35/005 | |
| 9,669,884 B2* | 6/2017 | Bassily | B62D 35/001 | |
| 9,688,320 B2* | 6/2017 | Courtney | B62D 35/001 | |
| 9,764,781 B2* | 9/2017 | Bezner | B62D 35/001 | |
| 9,809,260 B2* | 11/2017 | Smith | B62D 35/001 | |
| 9,969,445 B2* | 5/2018 | Persson | B62D 35/008 | |
| 10,189,514 B2* | 1/2019 | Senatro | B62D 35/001 | |
| 10,189,517 B2* | 1/2019 | Povinelli | B62D 35/008 | |
| 2002/0021023 A1* | 2/2002 | Leban | B62D 35/001 | 296/180.1 |
| 2003/0079310 A1* | 5/2003 | Lenzmeier | E01H 1/0863 | 15/340.1 |
| 2005/0146161 A1* | 7/2005 | Uland | B62D 35/02 | 296/180.1 |
| 2006/0152038 A1* | 7/2006 | Graham | B60R 19/565 | 296/180.1 |
| 2009/0146453 A1* | 6/2009 | Ortega | B62D 35/001 | 296/180.4 |
| 2009/0189414 A1* | 7/2009 | Boivin | B62D 35/001 | 296/180.4 |
| 2010/0109377 A1* | 5/2010 | Calco | B60J 1/20 | 296/152 |
| 2011/0068605 A1* | 3/2011 | Domo | B62D 35/02 | 296/180.4 |
| 2011/0285167 A1* | 11/2011 | Butler | B62D 35/001 | 296/180.1 |
| 2012/0223544 A1* | 9/2012 | Benton | B62D 35/001 | 296/180.1 |
| 2013/0238198 A1* | 9/2013 | Prentice | B62D 35/02 | 701/49 |
| 2016/0309973 A1* | 10/2016 | Sheikh | A47L 11/282 | |
| 2017/0057565 A1* | 3/2017 | Sarhadiangardabad | B62D 35/02 | |
| 2018/0056926 A1* | 3/2018 | Barron | B60Q 1/2661 | |
| 2018/0281611 A1* | 10/2018 | Sebestyen | B60L 5/42 | |

\* cited by examiner

ADJUSTABLE BODY SKIRTING ASSEMBLY AND A VEHICLE

INTRODUCTION

Vehicles have been designed with aerodynamic systems, such as an adjustable spoiler disposed along a top of a trunk area, which can change the downforce applied to the vehicle. Other vehicles can include static members extending therefrom, which cannot be adjusted.

SUMMARY

The present disclosure provides an adjustable body skirting assembly including a support structure and a skirt member. The support structure includes a side surface and a bottom surface, and the skirt member is supported by the support structure. The skirt member is elongated relative to a longitudinal direction. The skirt member is movable between a deployed position in which the skirt member is disposed transverse to the bottom surface of the support structure such that the skirt member and the side surface cooperate with each other to define a wall that is configured to redirect an airflow away from the bottom surface, and a retracted position in which the skirt member retracts relative to the side surface such that the wall is removed which allows the airflow to interact with the bottom surface. The adjustable body skirting assembly also includes an actuator coupled to the skirt member and configured to move the skirt member to the deployed position and the retracted position.

The adjustable body skirting assembly optionally includes one or more of the following:

A) the actuator includes a pivot point, and the skirt member is coupled to the pivot point;

B) the skirt member is rotatable about the pivot point between the deployed position and the retracted position in response to the actuator;

C) the actuator includes a motor disposed behind the side surface and the bottom surface;

D) the actuator includes an arm fixed to the skirt member, with the pivot point defined by the arm;

E) the actuator includes a track;

F) the skirt member is coupled to the track such that the skirt member is movable linearly relative to the side surface between the deployed position and the retracted position;

G) the skirt member includes a plurality of panels attached to each other, and the panels are movable linearly relative to each other between the deployed position and the retracted position;

H) the panels stack in a row relative to each other when in the retracted position;

I) the support structure defines a pocket, with the panels movable into the pocket when in the retracted position;

J) the pocket is defined through the bottom surface and is disposed behind the side surface;

K) the panels are movable linearly into the pocket when in the retracted position;

L) the support structure defines a pocket, with the skirt member movable into the pocket when in the retracted position;

M) the skirt member includes a first end and a second end spaced from each other;

N) the skirt member includes a first side and a second side opposing the first side, with the first and second sides extending to the first and second ends;

O) the first side of the skirt member is continuous between the first and second ends such that the airflow is directed along the first side and away from the bottom surface when the skirt member is in the deployed position;

P) the skirt member is characterized by an absence of a through-void that is configured to allow the airflow through the skirt member;

Q) the actuator includes a pivot point, and the skirt member is coupled to the pivot point such that the skirt member is rotatable about the pivot point between the deployed position and the retracted position;

R) the skirt member includes a first side and a second side opposing the first side, with the second side of the skirt member facing the bottom surface when the skirt member is in the retracted position;

S) the actuator includes a track coupled to the motor;

T) the support structure defines a pocket through the bottom surface and is disposed behind the side surface; and U) the panels of the skirt member are movable linearly into the pocket when in the retracted position such that the panels stack in a row relative to each other when in the retracted position.

The present disclosure also provides a vehicle including a body structure. The body structure includes a support structure disposed between a pair of wheels. The wheels are spaced from each other relative to a longitudinal direction. The support structure includes a side surface and a bottom surface. The vehicle also includes an adjustable body skirting assembly coupled to the body structure. The assembly includes a skirt member supported by the support structure. The skirt member is elongated relative to the longitudinal direction. The skirt member is movable between a deployed position in which the skirt member is disposed transverse to the bottom surface of the support structure such that the skirt member and the side surface cooperate with each other to define a wall that is configured to redirect an airflow away from the bottom surface, and a retracted position in which the skirt member retracts relative to the side surface such that the wall is removed which allows the airflow to interact with the bottom surface. The assembly also includes an actuator coupled to the skirt member and configured to move the skirt member to the deployed position and the retracted position.

The vehicle optionally includes one or more of the following:

A) the body structure includes a pair of wheelhouses, with one of the wheels disposed in one of the wheelhouses and another one of the wheels disposed in another one of the wheelhouses;

B) the skirt member includes a first end and a second end spaced from each other relative to the longitudinal direction;

C) the first end of the skirt member is disposed proximal to one of the wheelhouses and the second end of the skirt member is disposed proximal to the other one of the wheelhouses;

D) the skirt member is characterized by an absence of a through-void that is configured to allow the airflow through the skirt member between the first and second ends;

E) the actuator includes a pivot point, and the skirt member is coupled to the pivot point such that the skirt member is rotatable about the pivot point between the deployed position and the retracted position;

F) the actuator includes a motor disposed behind the side surface and the bottom surface;

G) the actuator includes an arm fixed to the skirt member, with the pivot point defined by the arm;

H) the skirt member includes a first side and a second side opposing the first side, with the second side of the skirt member facing the bottom surface when the skirt member is in the retracted position;

I) the first side of the skirt member is continuous between the first and second ends such that the airflow is directed along the first side and away from the bottom surface when the skirt member is in the deployed position;

J) the actuator includes a track coupled to the motor, and the skirt member is coupled to the track such that the skirt member is movable linearly relative to the side surface between the deployed position and the retracted position;

K) the skirt member includes a plurality of panels attached to each other, and the panels are movable linearly relative to each other between the deployed position and the retracted position;

L) the support structure defines a pocket through the bottom surface and is disposed behind the side surface;

M) the panels of the skirt member are movable linearly into the pocket when in the retracted position such that the panels stack in a row relative to each other when in the retracted position;

N) the support structure is further defined as a pair of doors;

O) the doors each define a pocket, with the skirt member movable into the pocket when in the retracted position;

P) the support structure is further defined as a rocker panel; and

Q) the rocker panel defines a pocket, with the skirt member movable into the pocket when in the retracted position.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
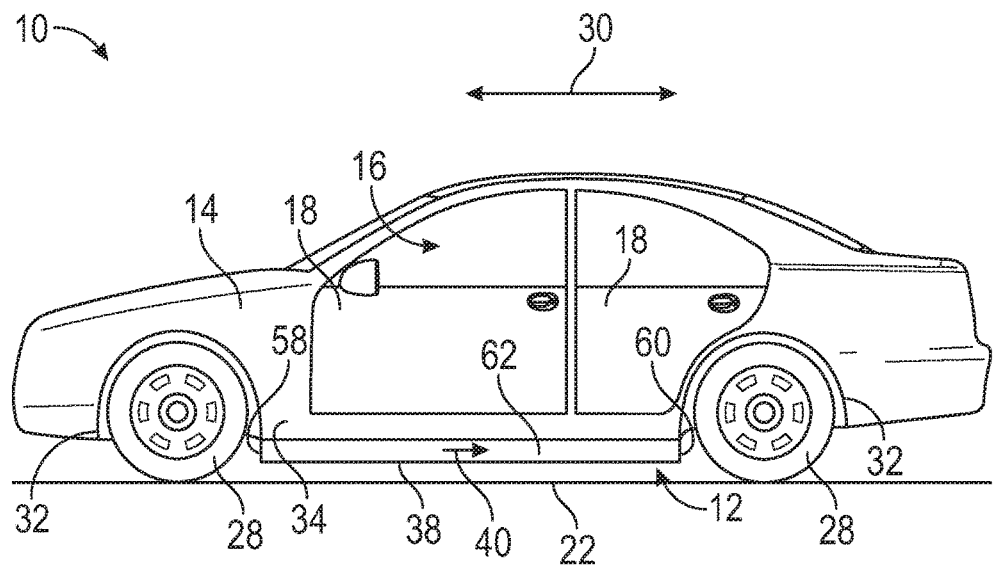
FIG. 1 is a schematic side view of a vehicle and an adjustable body skirting assembly, with a skirt member in a deployed position.

Referring to the FIGS., wherein like numerals indicate like or corresponding parts throughout the several views, a vehicle 10 and an adjustable body skirting assembly 12 are generally shown in FIG. 1. Generally, the adjustable body skirting assembly 12 can reduce drag, which is discussed further below.

The adjustable body skirting assembly 12 can be utilized in a vehicle 10 application or a non-vehicle application. Non-limiting examples of the vehicle 10 can include cars, sports cars, race cars, trucks, off-road vehicles, motorcycles, aircrafts, farm equipment or any other suitable movable platform. Additionally, the vehicle 10 can include autonomously driven vehicles or vehicles driven via a human. Non-limiting examples of the non-vehicles can include machines, farm equipment or any other suitable non-vehicle.

For the vehicle application as shown in FIG. 1, the vehicle 10 can include a body structure 14. In certain embodiments, the adjustable body skirting assembly 12 can be coupled to the body structure 14. Additionally, the body structure 14 can define a passenger compartment 16. Generally, one or more occupants can be disposed in the passenger compartment 16. Furthermore, for a vehicle driven by the human, one of the occupants can steer the vehicle 10 from the passenger compartment 16. The passenger compartment 16 can have one or more doors 18 that open and close to allow the occupants to enter and exit the vehicle 10.

Continuing with FIG. 1, the body structure 14 can also include a bottom panel 20 (labeled in FIGS. 2 and 3) that conceals various internal parts. For example, the bottom panel 20 can conceal various parts from view outside of the vehicle 10. In various embodiments, the bottom panel 20 can be disposed under the passenger compartment 16. For example, the bottom panel 20 can be partially disposed under the passenger compartment 16 or completely disposed under the passenger compartment 16. It is to be appreciated that the bottom panel 20 can be formed as one piece or a plurality of pieces.

Furthermore, the body structure 14 can include an interior compartment, and the bottom panel 20 can also be disposed under the interior compartment. Therefore, the bottom panel 20 can also define a bottom of the interior compartment. In certain embodiments, the interior compartment can be an engine compartment or a storage compartment. Generally, the interior compartment can be spaced from the passenger compartment 16. In certain embodiments, the bottom panel 20 can include a belly pan.

Figure 2:
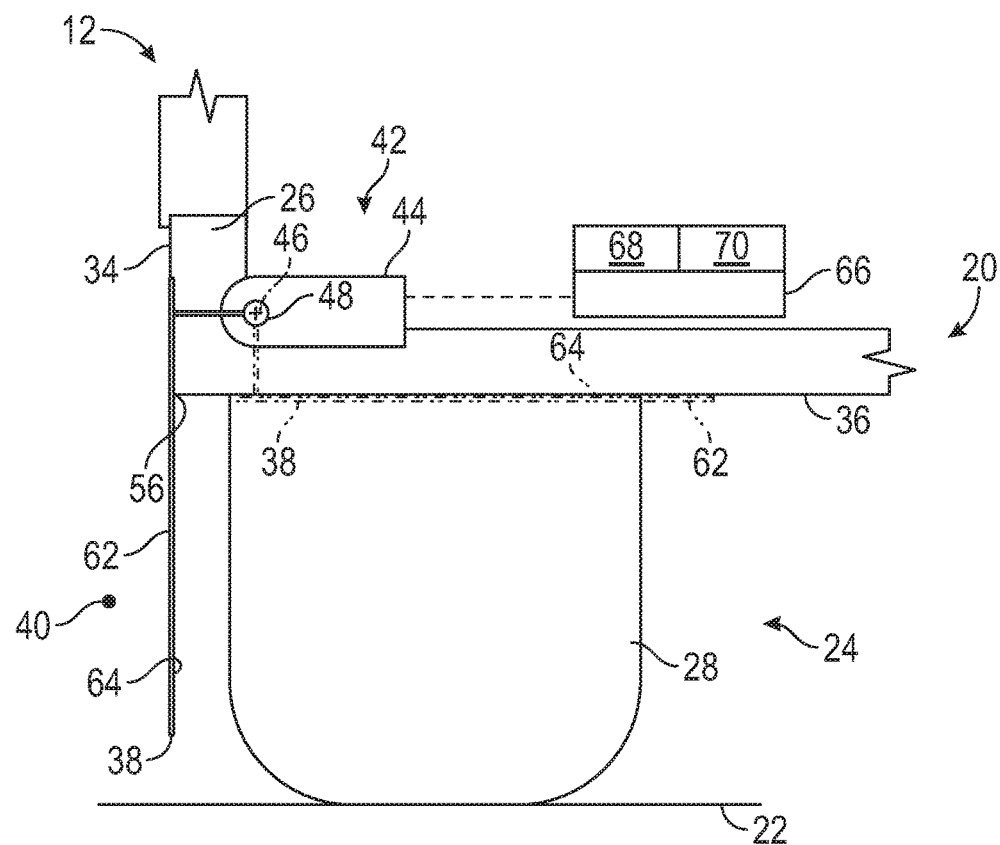
FIG. 2 is a schematic illustration of the skirt member of one configuration being in the deployed position in solid lines and being in a retracted position in phantom lines.
Figure 3:
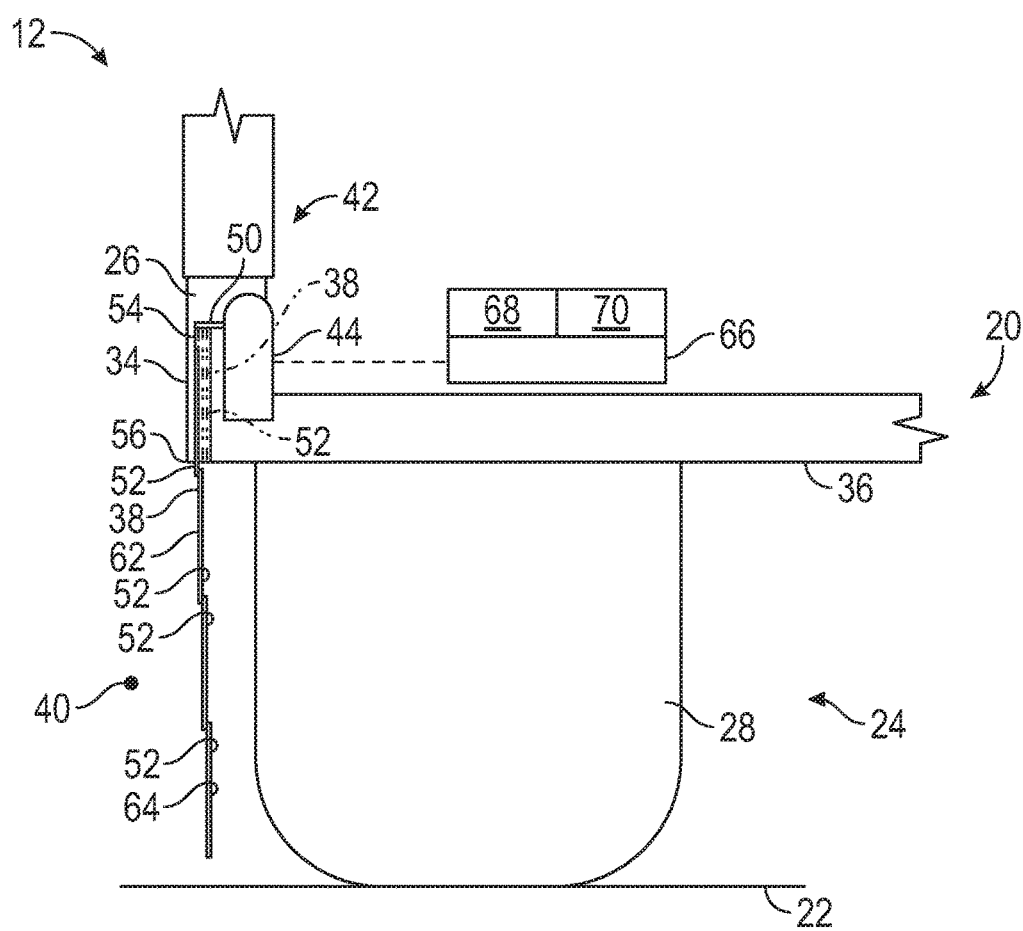
FIG. 3 is a schematic illustration of the skirt member of another configuration being in the deployed position in solid lines and being in the retracted position in phantom lines.

As best shown in FIGS. 2 and 3, the bottom panel 20 can include an inner surface facing various internal parts and an outer surface can oppose the inner surface to face away from the internal parts. Therefore, generally, the outer surface of the bottom panel 20 faces the ground 22 that the vehicle 10 travels over. The area between the bottom panel 20 and the ground 22 can be referred to as an underbody 24.

As best shown in FIGS. 2 and 3, the adjustable body skirting assembly 12 includes a support structure 26. In certain embodiments, the body structure 14 can include the support structure 26. The support structure 26 can be various configurations, and non-limiting examples can include one or more of the doors 18, one or more rocker panels, the bottom panel 20, a side panel transverse to the bottom panel 20, a frame, a running board in which a user can step on to enter and/or exit the vehicle 10, etc. As one non-limiting example, the support structure 26 can be further defined as a pair of doors 18. As another non-limiting example, the support structure 26 can be further defined as a rocker panel. The rocker panel can be disposed along a bottom edge of the vehicle 10. Furthermore, it is to be appreciated that the support structure 26 can be formed as one piece or a plurality of pieces.

As best shown in FIG. 1, the support structure 26 can be disposed between a pair of wheels 28. The wheels 28 are movable relative to the ground 22 to propel the vehicle 10 in a direction. Generally, the wheels 28 are spaced from each other relative to a longitudinal direction 30 (see arrow 30 in FIG. 1).

Continuing with FIG. 1, the body structure 14 can also include a pair of wheelhouses 32. One of the wheels 28 can be disposed in one of the wheelhouses 32 and another one of the wheels 28 can be disposed in another one of the wheelhouses 32. Generally, the wheelhouses 32 are spaced from each other relative to the longitudinal direction 30.

Referring to FIGS. 2 and 3, the support structure 26 includes a side surface 34 and a bottom surface 36. Generally, the side surface 34 is transverse to the bottom surface 36. In certain embodiments, the side surface 34 can be visible from outside of the vehicle 10. The bottom surface 36 can face the ground 22. In certain embodiments, the bottom surface 36 conceals from sight various parts under the vehicle 10.

Referring to FIGS. 1-3, the adjustable body skirting assembly 12 also includes a skirt member 38 supported by the support structure 26. As best shown in FIG. 1, the skirt member 38 is elongated relative to the longitudinal direction 30. The skirt member 38 is movable between a deployed position in which the skirt member 38 is disposed transverse to the bottom surface 36 of the support structure 26 such that the skirt member 38 and the side surface 34 cooperate with each other to define a wall that is configured to redirect an airflow 40 away from the bottom surface 36, and a retracted position in which the skirt member 38 retracts relative to the side surface 34 such that the wall is removed which allows the airflow 40 to interact with the bottom surface 36.

FIG. 1 best illustrates one side of the vehicle 10, and it is to be appreciated that the other side of the vehicle 10 can be a mirror image of the illustrated side. The sides of the vehicle 10 are spaced from each other in a cross-car direction. The cross-car direction is transverse or perpendicular to the longitudinal direction 30. As such, the other side of the vehicle 10 can include another skirt member 38. Said differently, both sides of the vehicle 10 can include respective skirt members 38. Therefore, the adjustable body skirting assembly 12 can include a plurality of skirt members 38, and each of the skirt members 38 can be configured/function as described herein for the one skirt member 38.

If the vehicle 10 is traveling in a forward direction, the airflow 40 can be in the direction as shown in FIG. 1 via arrow 40. Therefore, when the skirt member 38 is in the deployed position, the skirt member 38 shields the underbody 24 of the vehicle 10 from the airflow 40 entering the sides of the vehicle 10. Therefore, the airflow 40 under the vehicle 10 is reduced, which reduces drag under the vehicle 10. The skirt member 38 can overlap a portion of the support structure 26 when the skirt member 38 is in the deployed position, which further assists in preventing the airflow 40 from entering the underbody 24 when the skirt member 38 is in the deployed position.

The skirt member 38 is raised to the retracted position when, for example, additional clearance between the ground 22 and the skirt member 38 is desired. The skirt member 38 can be recessed behind the side surface 34 when the skirt member 38 is in the retracted position. As such, in certain embodiments, the skirt member 38 does not extend beyond the side surface 34 relative to being generally parallel with the ground 22 when the skirt member 38 is in the retracted position.

Referring to FIGS. 2 and 3, the adjustable body skirting assembly 12 further includes an actuator 42 coupled to the skirt member 38. The skirt member 38 is configured to move the skirt member 38 to the deployed position and the retracted position. The actuator 42 can be concealed behind the side surface 34 and/or the bottom surface 36. In certain embodiments, the actuator 42 can include a motor 44 disposed behind the side surface 34 and the bottom surface 36. Simply stated, in certain embodiments, the motor 44 can be hidden behind the side surface 34 and the bottom surface 36. Therefore, the actuator 42/the motor 44 can be hidden from view outside of the vehicle 10.

The motor 44 can be any suitable configuration, and non-limiting examples can include an electric motor 44, etc. If utilizing a plurality of skirt members 38, one actuator 42 can be coupled to each of the skirt members 38, or alternatively, a plurality of actuators 42 can be utilized, with one of the actuators 42 controlling the position of one of the skirt members 38 and another one of the actuators 42 controlling the position of the other one of the skirt members 38, etc.

Furthermore, the actuator 42 can cause the skirt member 38 to move in different ways between the deployed and retracted positions. For example, the skirt member 38 can be rotatable, movable linearly in one or more directions, movable in multiple ways, etc.

Referring to FIG. 2, in certain embodiments, the actuator 42 can include a pivot point 46, and the skirt member 38 can be coupled to the pivot point 46. For example, the skirt member 38 can be coupled to the pivot point 46 such that the skirt member 38 is rotatable about the pivot point 46 between the deployed position and the retracted position. In this embodiment, the skirt member 38 can be rotatable about the pivot point 46 between the deployed position and the retracted position in response to the actuator 42. Furthermore, in this embodiment, the actuator 42 can include an arm 48 fixed to the skirt member 38, with the pivot point 46 defined by the arm 48.

Referring to FIG. 3, in other embodiments, the actuator 42 can include a track 50. The skirt member 38 can be coupled to the track 50 such that the skirt member 38 is movable linearly relative to the side surface 34 between the deployed position and the retracted position. In certain embodiments, the linear movement of the skirt member 38 can be transverse or generally perpendicular to the ground 22 or bottom surface 36 of the support structure 26. Said differently, the linear movement of the skirt member 38 can be generally parallel to the side surface 34 of the support structure 26. Furthermore, the track 50 can be coupled to the motor 44 of the actuator 42. Therefore, actuation of the motor 44 causes the track 50 to move the skirt member 38 accordingly.

For the embodiment of FIG. 3, the skirt member 38 can be formed of one piece or a plurality of pieces. Therefore, in certain embodiments, the skirt member 38 can include a plurality of panels 52 attached to each other. The panels 52 can be movable linearly relative to each other between the deployed position and the retracted position. Furthermore, the panels 52 can be coupled to the track 50 to move the panels 52 between the deployed and retracted positions. The panels 52 can be stacked in a row relative to each other when in the retracted position (see phantom lines of the panels 52 in FIG. 3).

As mentioned above, the skirt member 38 can be stowed out of sight. This can occur by, for example, rotating the skirt member 38 to the retracted position and/or moving the skirt member 38 linearly to the retracted position. In certain embodiments, the support structure 26 can optionally define a pocket 54. Generally, the skirt member 38 can be movable into the pocket 54 when in the retracted position.

The pocket 54 can be different configurations, depending, for example, on the movement of the skirt member 38. For example, for the configuration of FIG. 2, the bottom surface 36 can optionally define the pocket 54 and the skirt member 38 can be rotatable into the pocket 54 when in the retracted position. As another example, for the configuration of FIG. 3, the panels 52 can be movable into the pocket 54 when in the retracted position. Generally, in certain embodiments, the panels 52 can be movable linearly into the pocket 54 when in the retracted position. More specifically, the panels 52 of the skirt member 38 can be movable linearly into the pocket 54 when in the retracted position such that the panels 52 stack in the row relative to each other when in the retracted position (see FIG. 3).

Continuing with FIG. 3, the support structure 26 can define the pocket 54 through the bottom surface 36 and is disposed behind the side surface 34. Said differently, the pocket 54 can be defined through the bottom surface 36 and disposed behind the side surface 34. As such, in certain embodiments, the pocket 54 can be open toward the ground 22, which allows linearly movement of the panels 52 toward and away from the ground 22.

As best shown in FIGS. 2 and 3, the side surface 34 and the bottom surface 36 can meet at a corner 56. Therefore, the side surface 34 and one or more doors 18 can be disposed adjacent to each other, and can for example, be visible along the same side of the vehicle 10. The rocker panel of the vehicle 10 can be disposed along the corner 56 of the vehicle 10. In certain embodiments, the doors 18 can each define the pocket 54, with the skirt member 38 movable into the pocket 54 (of the door 18) when in the retracted position. In other embodiments, the rocker panel can define the pocket 54, with the skirt member 38 movable into the pocket 54 (of the rocker panel) when in the retracted position. In yet other embodiments, the support structure 26 can be the running board, and therefore, the skirt member 38 can be movable relative to the running board. As such, the running board can define the pocket 54, with the skirt member 38 movable into the pocket 54 when in the retracted position.

Referring to FIG. 1, the skirt member 38 can include a first end 58 and a second end 60 spaced from each other. The first and second ends 58, 60 of the skirt member 38 can be spaced from each other relative to the longitudinal direction 30. Additionally, as best shown in FIGS. 2 and 3, the skirt member 38 can include a first side 62 and a second side 64 opposing the first side 62. The first and second sides 62, 64 can extend to the first and second ends 58, 60. The first side 62 of the skirt member 38 can face outward away from the underbody 24 of the vehicle 10 when in the deployed position. Furthermore, in certain embodiments, the second side 64 of the skirt member 38 can face the underbody 24 of the vehicle 10 when the skirt member 38 is in the deployed position. In various embodiments, the second side 64 of the skirt member 38 can face the bottom surface 36 when the skirt member 38 is in the retracted position. In other embodiments, the second side 64 of the skirt member 38 can face away from the side surface 34 when the skirt member 38, such as the panels 52, is in the retracted position.

Generally, the skirt member 38 is elongated to prevent a substantial amount of the airflow 40 from entering the underbody 24 relative to the skirt member 38 when in the deployed position to minimize drag. Furthermore, the first side 62 of the skirt member 38 can be continuous between the first and second ends 58, 60 such that the airflow 40 is directed along the first side 62 and away from the bottom surface 36 when the skirt member 38 is in the deployed position. Therefore, in certain embodiments, the first end 58 of the skirt member 38 can be disposed proximal to one of the wheelhouses 32 and the second end 60 of the skirt member 38 can be disposed proximal to the other one of the wheelhouses 32, and the skirt member 38 can be continuous to prevent the substantial amount of the airflow 40 from entering the underbody 24 when in the deployed position.

The skirt member 38 can be disposed proximal to the side surface 34 so that a majority of the underbody 24 is shielded from the airflow 40 when the skirt member 38 is in the deployed position. Said differently, the skirt member 38 can be disposed proximal the corner 56 to shield the majority of the underbody 24 from the airflow 40 when the skirt member 38 is in the deployed position. As such, the skirt member 38 provides a configuration that does not allow the airflow 40 through the skirt member 38 between the first and second ends 58, 60.

Hence, the skirt member 38 can be characterized by an absence of a through-void that is configured to allow the airflow 40 through the skirt member 38. More specifically, the skirt member 38 is characterized by an absence of the through-void that is configured to allow the airflow 40 through the skirt member 38 between the first and second ends 58, 60. Configuring the skirt member 38 without the through-void further assists in minimizing drag under the vehicle 10.

In certain embodiments, the adjustable body skirting assembly 12 can include a controller 66 (see FIGS. 2 and 3) in communication with the actuator 42 to signal the actuator 42 to move the skirt member 38 to one of the deployed position and the retracted position. It is to be appreciated if utilizing a plurality of actuators 42, one controller 66 can be in communication with all of the actuators 42, or alternatively, a plurality of controllers 66 can be utilized, with one of the controllers 66 in communication with one of the actuators 42, and another one of the controllers 66 in communication with another one of the actuators 42, etc. Also, if utilizing a plurality of controllers 66, each of the controllers 66 can be in communication with each other.

The controller 66 can include a processor 68 and a memory 70 on which is recorded instructions for communicating with the actuator(s) 42, the controller(s) 66, etc. The controller 66 is configured to execute the instructions from the memory 70, via the processor 68. For example, the controller 66 can be a host machine or distributed system, e.g., a computer such as a digital computer or microcomputer, and/or as a proportional-integral-derivative (PID) controller device having the processor 68, and, as the memory 70, tangible, non-transitory computer-readable memory such as read-only memory (ROM) or flash memory. The controller 66 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 66 can include all software, hardware, memory 70, algorithms, connections, sensors, etc., necessary to communicate with the actuator(s) 42, the controller(s) 66, etc. It is to be appreciated that the controller 66 can also include any device capable of analyzing data from various sensors, comparing data, making the necessary decisions required to communicate with the actuator(s) 42, the controller(s) 66, etc.

Furthermore, the adjustable body skirting assembly 12 can further include a switch in communication with the controller 66 and/or the actuator 42. Activating the switch can cause the skirt member 38 to move to one of the deployed position and the retracted position. The skirt member 38 can be repositioned when the vehicle 10 is stationary or moving. Therefore, the switch can be located in the passenger compartment 16 such that the occupant of the vehicle 10 can determine which position the skirting member is supposed to be disposed in at any time.

The switch can be in communication with an indicator such that the occupant can determine which position the skirt member 38 is disposed in. The indicator can be located in the passenger compartment 16. The indicator can include a visual indicator, a sound indicator and/or any other suitable indicator.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adjustable body skirting assembly comprising:
   a support structure including a side surface and a bottom surface;
   a skirt member supported by the support structure and being elongated relative to a longitudinal direction;
   wherein the skirt member is movable between a deployed position in which the skirt member is disposed transverse to the bottom surface of the support structure such that the skirt member and the side surface cooperate with each other to define a wall that is configured to redirect an airflow away from the bottom surface, and a retracted position in which the skirt member retracts relative to the side surface such that the wall is removed which allows the airflow to interact with the bottom surface;
   an actuator coupled to the skirt member and configured to move the skirt member to the deployed position and the retracted position; and
   wherein the support structure defines a pocket, with the skirt member movable into the pocket when in the retracted position.

2. The assembly as set forth in claim 1 wherein the actuator includes a pivot point, and the skirt member is coupled to the pivot point, and wherein the skirt member is rotatable about the pivot point between the deployed position and the retracted position in response to the actuator.

3. The assembly as set forth in claim 2 wherein the actuator includes a motor disposed behind the side surface and the bottom surface, and the actuator includes an arm fixed to the skirt member, with the pivot point defined by the arm.

4. The assembly as set forth in claim 1 wherein the actuator includes a track, and the skirt member is coupled to the track such that the skirt member is movable linearly relative to the side surface between the deployed position and the retracted position.

5. The assembly as set forth in claim 4 wherein the skirt member includes a plurality of panels attached to each other, and the panels are movable linearly relative to each other between the deployed position and the retracted position, and wherein the panels stack in a row relative to each other when in the retracted position.

6. The assembly as set forth in claim 5 wherein the support structure defines a pocket, with the panels movable into the pocket when in the retracted position.

7. The assembly as set forth in claim 6 wherein the pocket is defined through the bottom surface and is disposed behind the side surface, and wherein the panels are movable linearly into the pocket when in the retracted position.

8. The assembly as set forth in claim 1 wherein:
   the skirt member includes a first end and a second end spaced from each other;
   the skirt member includes a first side and a second side opposing the first side, with the first and second sides extending to the first and second ends; and
   the first side of the skirt member is continuous between the first and second ends such that the airflow is directed along the first side and away from the bottom surface when the skirt member is in the deployed position.

9. The assembly as set forth in claim 1 wherein the skirt member is characterized by an absence of a through-void that is configured to allow the airflow through the skirt member.

10. The assembly as set forth in claim 1 wherein:
    the actuator includes a pivot point, and the skirt member is coupled to the pivot point such that the skirt member is rotatable about the pivot point between the deployed position and the retracted position;
    the actuator includes a motor disposed behind the side surface and the bottom surface, and the actuator includes an arm fixed to the skirt member, with the pivot point defined by the arm;
    the skirt member includes a first end and a second end spaced from each other;
    the skirt member includes a first side and a second side opposing the first side, with the second side of the skirt member facing the bottom surface when the skirt member is in the retracted position; and
    the first side of the skirt member is continuous between the first and second ends such that the airflow is directed along the first side and away from the bottom surface when the skirt member is in the deployed position.

11. The assembly as set forth in claim 1 wherein:
    the actuator includes a motor disposed behind the side surface and the bottom surface;
    the actuator includes a track coupled to the motor, and the skirt member is coupled to the track such that the skirt member is movable linearly relative to the side surface between the deployed position and the retracted position;
    the skirt member includes a plurality of panels attached to each other, and the panels are movable linearly relative to each other between the deployed position and the retracted position;
    the pocket is defined through the bottom surface and is disposed behind the side surface; and
    the panels of the skirt member are movable linearly into the pocket when in the retracted position such that the panels stack in a row relative to each other when in the retracted position.

12. The assembly as set forth in claim 1 which is configured to be utilized in a vehicle comprising:
    a body structure including the support structure disposed between a pair of wheels; and wherein the wheels are spaced from each other relative to the longitudinal direction.

13. The assembly as set forth in claim 12 wherein:
the body structure includes a pair of wheelhouses, with one of the wheels disposed in one of the wheelhouses and another one of the wheels disposed in another one of the wheelhouses;
the skirt member includes a first end and a second end spaced from each other relative to the longitudinal direction;
the first end of the skirt member is disposed proximal to one of the wheelhouses and the second end of the skirt member is disposed proximal to the other one of the wheelhouses; and
the skirt member is characterized by an absence of a through-void that is configured to allow the airflow through the skirt member between the first and second ends.

14. The assembly as set forth in claim 12 wherein the support structure is further defined as a pair of doors.

15. The assembly as set forth in claim 14 wherein the doors each define the pocket, with the skirt member movable into the pocket when in the retracted position.

16. The assembly as set forth in claim 12 wherein the support structure is further defined as a rocker panel.

17. The assembly as set forth in claim 16 wherein the rocker panel defines the pocket, with the skirt member movable into the pocket when in the retracted position.

18. An adjustable body skirting assembly comprising:
a support structure including a side surface and a bottom surface;
a skirt member supported by the support structure and being elongated relative to a longitudinal direction;
wherein the skirt member is movable between a deployed position in which the skirt member is disposed transverse to the bottom surface of the support structure such that the skirt member and the side surface cooperate with each other to define a wall that is configured to redirect an airflow away from the bottom surface, and a retracted position in which the skirt member retracts relative to the side surface such that the wall is removed which allows the airflow to interact with the bottom surface;
an actuator coupled to the skirt member and configured to move the skirt member to the deployed position and the retracted position; and
wherein the actuator includes a track, and the skirt member is coupled to the track such that the skirt member is movable linearly relative to the side surface between the deployed position and the retracted position.

19. The assembly as set forth in claim 18 wherein the support structure defines a pocket, with the skirt member movable into the pocket when in the retracted position.

20. An adjustable body skirting assembly comprising:
a support structure including a side surface and a bottom surface;
a skirt member supported by the support structure and being elongated relative to a longitudinal direction;
wherein the skirt member is movable between a deployed position in which the skirt member is disposed transverse to the bottom surface of the support structure such that the skirt member and the side surface cooperate with each other to define a wall that is configured to redirect an airflow away from the bottom surface, and a retracted position in which the skirt member retracts relative to the side surface such that the wall is removed which allows the airflow to interact with the bottom surface;
an actuator coupled to the skirt member and configured to move the skirt member to the deployed position and the retracted position;
wherein the support structure is further defined as a rocker panel; and
wherein the rocker panel defines a pocket, with the skirt member movable into the pocket when in the retracted position.

* * * * *